(12) United States Patent
Homer et al.

(10) Patent No.: US 7,837,221 B2
(45) Date of Patent: Nov. 23, 2010

(54) SRS SERVICEABLE MODULE AND METHODS OF INSTALLING AND REMOVING

(75) Inventors: Steven Homer, Dublin, OH (US); Toru Kobayashi, Dublin, OH (US); Douglas E. Haunhorst, Powell, OH (US); Richard B. Cox, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 12/255,274

(22) Filed: Oct. 21, 2008

(65) Prior Publication Data

US 2010/0096840 A1 Apr. 22, 2010

(51) Int. Cl.
*B60R 21/16* (2006.01)

(52) U.S. Cl. .................... 280/728.2; 280/732

(58) Field of Classification Search ............. 280/728.2, 280/732
See application file for complete search history.

(56) References Cited

U.S. PATENT DOCUMENTS

| | | | |
|---|---|---|---|
| 5,295,708 A | 3/1994 | Siga et al. |
| 5,333,901 A | 8/1994 | Barnes |
| 5,398,960 A | 3/1995 | Ravenberg et al. |
| 5,398,961 A | 3/1995 | Rogers et al. |
| 5,445,409 A | 8/1995 | Abramczyk et al. |
| 5,489,116 A | 2/1996 | Boag |
| 5,664,801 A | 9/1997 | Gray et al. |
| 5,669,626 A | 9/1997 | Bartos et al. |
| 5,687,989 A | 11/1997 | Maesing et al. |
| 5,813,692 A | 9/1998 | Faigle et al. |
| 5,829,778 A | 11/1998 | Woolley et al. |
| 5,904,367 A | 5/1999 | Warnez et al. |
| 5,906,390 A | 5/1999 | Phillion et al. |
| 6,092,832 A | 7/2000 | Worrell et al. |
| 6,120,055 A | 9/2000 | Cuevas et al. |
| 6,460,874 B1 | 10/2002 | McDonnell et al. |
| 6,572,136 B2 * | 6/2003 | Inoue et al. ............... 280/728.2 |
| 6,623,029 B2 | 9/2003 | Sun et al. |
| 6,966,575 B2 | 11/2005 | Kobayashi et al. |
| 6,991,258 B2 | 1/2006 | Hawthorn et al. |
| 7,293,795 B2 | 11/2007 | Kong |
| 7,699,338 B2 * | 4/2010 | Dargavell et al. ........ 280/728.2 |
| 2003/0155756 A1 | 8/2003 | Hawthorn et al. |
| 2007/0035110 A1 | 2/2007 | Lee |
| 2010/0230935 A1 * | 9/2010 | Rose et al. ............... 280/728.2 |

* cited by examiner

*Primary Examiner*—Eric Culbreth
(74) *Attorney, Agent, or Firm*—Mark E. Doell, Esq.; Emerson Thomas Bennett

(57) ABSTRACT

A supplementary restraint system for a vehicle occupant is provided which includes a supplemental restraint system module assembly connected to an airbag deployment chute incorporated into a vehicle instrument panel. A module assembly support bracket is provided that attaches the module assembly onto a frame portion on the vehicle. The support bracket includes a hook for insertion into an aperture on the frame portion. The support bracket also includes one or more bracket holes for alignment with respective frame portion holes upon proper positioning of the hook. Methods of factory installation of an SRS and removal of a deployed SRS are also disclosed herewith.

20 Claims, 5 Drawing Sheets

SRS SERVICEABLE MODULE AND METHODS OF INSTALLING AND REMOVING

I. BACKGROUND OF THE INVENTION

A. Field of Invention

This invention pertains to the art of methods and apparatuses for restraining the movement of a vehicle occupant in the event of a collision. Particularly, this invention pertains to an airbag system for a vehicle that allows quick installation and replacement during a servicing operation.

B. Description of the Related Art

It is known in the art to use an airbag or supplementary restraint system (SRS) to protect vehicle occupants from injury in the event of a collision. As is understood in the art, an SRS immediately senses a collision and deploys or inflates an airbag toward the occupant which cushions the impact and thereby offers protection from injury during the collision.

After deployment of an SRS, a new unit must be installed, so as to provide safety to the vehicle occupant in the event of another collision. However, installation of a passenger SRS system can typically be a very involved procedure, requiring the dismantling of the vehicle instrument panel in order to remove the old unit and installation of the new unit. This results in considerable expense incurred by the vehicle owner and/or insurance company.

The present invention provides methods and apparatuses for simplifying the installation and removal of an SRS and also for providing a foolproof installation of a new SRS at the time of vehicle manufacture.

II. SUMMARY OF THE INVENTION

According to one embodiment of the present invention, a new and improved supplementary restraint system for a vehicle occupant is provided which includes a supplemental restraint system module assembly connected to an airbag deployment chute incorporated into a vehicle instrument panel. A module assembly support bracket is provided that attaches the module assembly onto a frame portion on the vehicle. The support bracket includes a hook for insertion into an aperture on the frame portion. The support bracket also includes one or more bracket holes for alignment with respective frame portion holes upon proper positioning of the hook.

According to another embodiment of the present invention, a method is provided of installing a supplementary restraint system for a vehicle occupant. An instrument panel is provided for a vehicle having an airbag deployment chute affixed the instrument panel. A supplemental restraint system module assembly is assembled to the airbag deployment chute. The instrument panel with the module assembly is attached onto a frame portion on the vehicle. The attaching includes inserting a hook attached to the module assembly into an aperture on the frame portion. The attaching also includes aligning the module assembly so that the hook engages an edge of the aperture and so that one or more module assembly holes line up with respective frame portion bolt holes. Respective fasteners are affixed into the holes so as to secure the module assembly and instrument panel to the frame portion.

According to still another embodiment of the present invention, a method is provided of removing a supplementary restraint system for a vehicle occupant. A supplemental restraint system module assembly is detached from a frame portion mounted to a vehicle. A removable hook plate is detached from the module assembly. A fixed hook plate attached to the module assembly is lifted from engagement with an airbag deployment chute. The module assembly is removed from underneath a vehicle instrument panel.

One advantage of this invention is that SRS installation and removal is simplified.

Another advantage of this invention is that a deployed SRS module can be removed without dismantling the entire instrument panel, thereby reducing expense to the vehicle owner.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

FIGS. 6A, 6B, 6C, and 6D are side sectional views showing the removal of a supplemental restraint system module assembly in accordance with the present invention.

IV. DETAILED DESCRIPTION OF THE INVENTION

Figure 1:
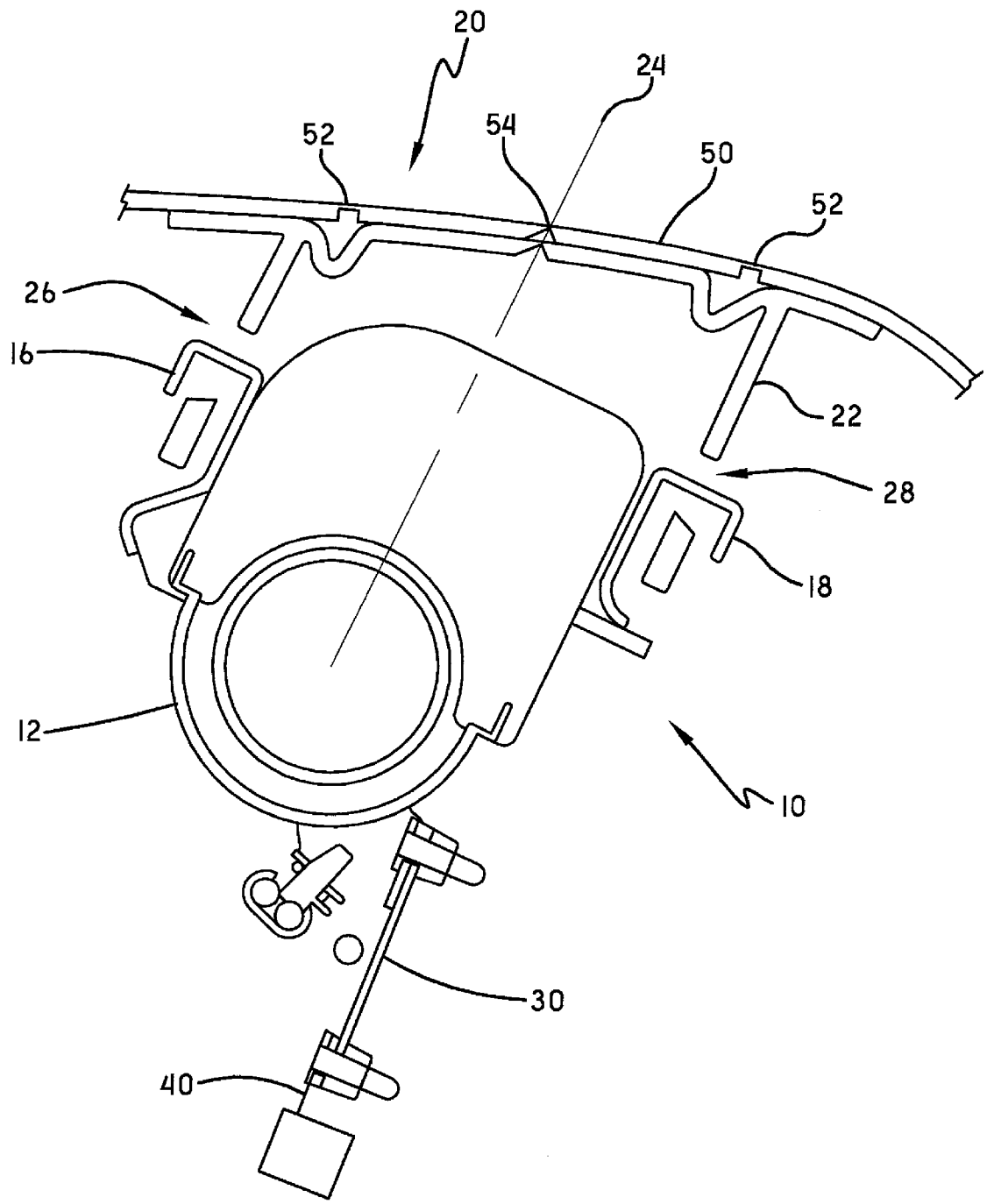
FIG. 1 is a side sectional view of a supplemental restraint system module assembly in accordance with the present invention.

Referring now to the drawings wherein the showings are for purposes of illustrating embodiments of the invention only and not for purposes of limiting the same, FIG. 1 shows a supplementary restraint system (SRS) 10 for a vehicle occupant. A vehicle instrument panel 20 includes an airbag deployment chute 22 incorporated therewith. An SRS module assembly 12 includes a packed airbag configured for deployment, as is understood in the art. The module assembly 12 is connected to the airbag deployment chute 22, as will be explained in detail hereinbelow.

Figure 2:
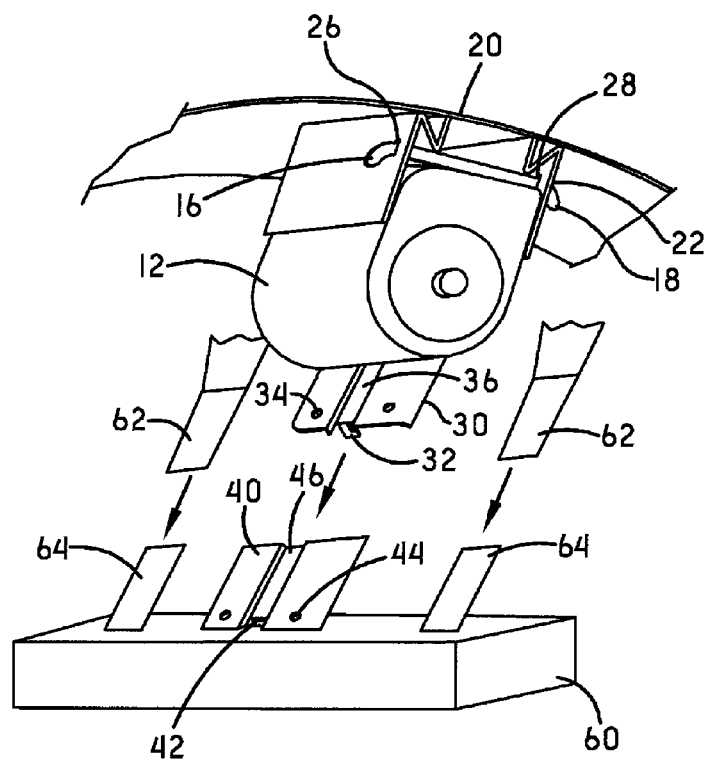
FIG. 2 is a perspective view showing the assembly of a supplemental restraint system module assembly during manufacture, in accordance with the present invention.
Figure 3:
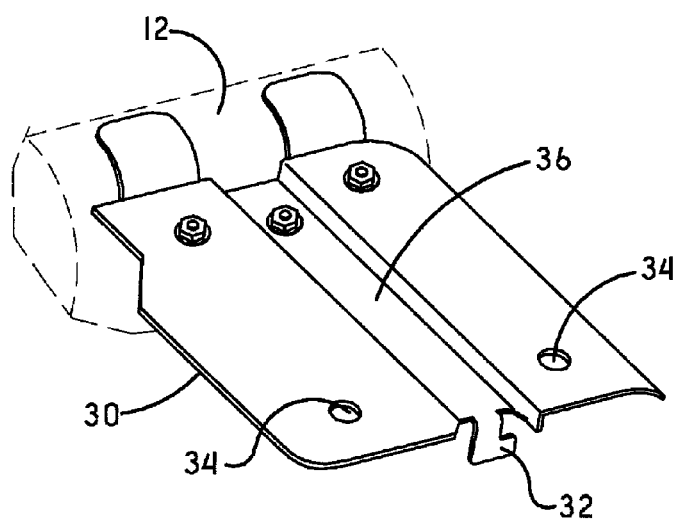
FIG. 3 is a perspective view of a module assembly support bracket as used with the supplemental restraint system module assembly in accordance with the present invention.

As shown especially in FIGS. 1, 2, and 3, a module assembly support bracket 30 is provided that attaches the module assembly 12 onto a frame portion 40 of the vehicle. It should be appreciated that the frame portion 40 is part of a support structure for the instrument panel 20 and is an integral component of the vehicle frame. The support bracket 30 includes a hook 32 for insertion into an aperture 42 on the frame portion 40. The support bracket 30 includes one or more bracket holes 34, in one embodiment two holes, for alignment with a respective number of frame portion holes 44 upon proper positioning of the hook 32.

As shown especially in FIGS. 1 and 2, the support bracket 30 extends away from the module assembly 12 in a direction opposite the instrument panel 20 and generally parallel to an axis 24 of the airbag deployment chute 22. In this way, the support bracket 30 can engage the frame portion 40 and provide structural support from the underside of the airbag deployment chute 22. As best seen in FIG. 1, the support bracket 30 is removably attached to the module assembly 12 with fasteners such as bolts, so as to enable removal after airbag deployment, as will be further discussed hereinbelow.

As generally indicated in FIGS. 1, 2, 4A, 4B, and 5A, the support bracket 30 includes a contact surface that engages a mating surface on the frame portion 40. In this way, these surfaces are generally flush upon engagement, indicated in the aforementioned FIGURES as being in contact. The aperture 42 is formed onto the mating surface of the frame portion. The hook 32 extends perpendicularly from a bottom edge of the support bracket 30 so as to be received within the aperture 42 when the contact surface engages the mating surface.

As shown especially in FIGS. 2, 3, 4A, 4B, 5A, and 5B, the contact surface of the support bracket 30 includes a protruding portion 36, which may run longitudinally in the direction parallel to the axis 24. The mating surface of the frame portion 40 includes a channel portion 46 that slidably receives the protruding portion 36. The hook 32 extends perpendicularly from the protruding portion 36 into the aperture 42. The aperture 42 is formed in the channel portion 46 to engage the hook 32. As especially indicated in FIGS. 4A and 4B, the protruding portion 36 slides in the channel portion 46 between a hook insertion position (FIG. 4A) and a hook engagement position (FIG. 4B) in which the hook 32 is securely engaged with the aperture 42 when holes 34, 44 are aligned.

As mentioned above and particularly indicated at FIGS. 2, 3, 4A, 4B, 5A, and 5B, the bracket holes 34 include first and second bracket holes 34, respectively disposed on opposite sides of the protruding portion 36. In this way, the holes 34 align with respective first and second frame portion holes 44, respectively disposed on opposite sides of the channel portion 46.

FIGS. 1, 2, 6A, 6B, 6C, and 6D particularly show the supplementary restraint module assembly 12 including a hook assembly for removably connecting to the airbag deployment chute 22. Specifically, the hook assembly includes a hook plate 16 fixedly mounted to the module assembly 12. The hook plate 16 is configured for insertion into a first window 26 on the airbag deployment chute 22. The hook assembly also includes a detachable bracket 18 that is removably attached to the module assembly 12, with a fastener, such as a bolt. The detachable bracket 18 is configured for insertion into a second window 28 on the airbag deployment chute 22 and is detachably secured to the side of the module assembly 12 during normal installation.

As best shown in FIG. 1, the airbag deployment chute 22 may be affixed to an interior surface of the instrument panel 20. The instrument panel 20 may include a frangible portion 50, proximate to the airbag deployment chute 22, that breaks away to allow airbag deployment. Airbag deployment may be facilitated by a plurality of tear seams along which the frangible portion breaks away during airbag deployment. Peripheral tear seams 52 may be located proximate to a periphery of the airbag deployment chute. A central tear seam 54 may be located along a central portion thereof, intersecting the axis 24.

A method of installing a supplementary restraint system 10 for a vehicle occupant is further disclosed herewith, as generally indicated by FIGS. 2, 4A, 4B, 5A, and 5B. An instrument panel 20 for a vehicle is provided having an airbag deployment chute 22 affixed to the instrument panel 20. A supplemental restraint system module assembly 12 is assembled to the airbag deployment chute 22. The instrument panel 20 with the module assembly 12 is attached onto a frame portion 40 on the vehicle.

As also indicated by FIGS. 2, 4A, 4B, 5A, and 5B, the aforementioned step of attaching entails a sub-step of inserting a hook 32 attached to the module assembly 12 into an aperture 42 on the frame portion 40. An additional sub-step is performed of aligning the module assembly 12 so that the hook 32 engages an edge of the aperture 42 so that one or more holes 34 associated with the module assembly 12 line up with respective frame portion holes 44. Fasteners, such as bolts, are respectively affixed into the bolt holes 34, 44 so as to secure the module assembly 12 and instrument panel 20 to the frame portion 40.

Figure 4A:
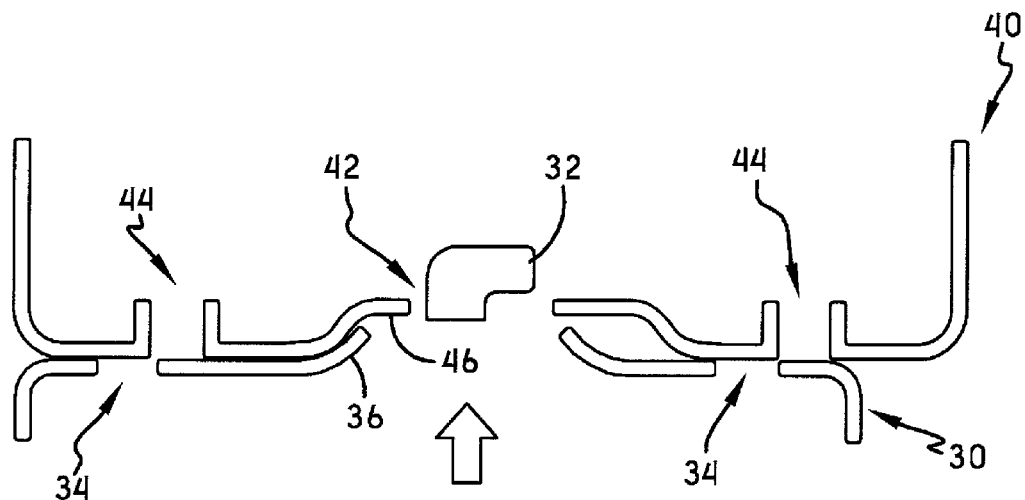
FIGS. 4A and 4B are top sectional views showing stages of the engagement of the module assembly support bracket of a supplemental restraint system module assembly with a frame portion of a vehicle frame in accordance with the present invention.
Figure 4B:
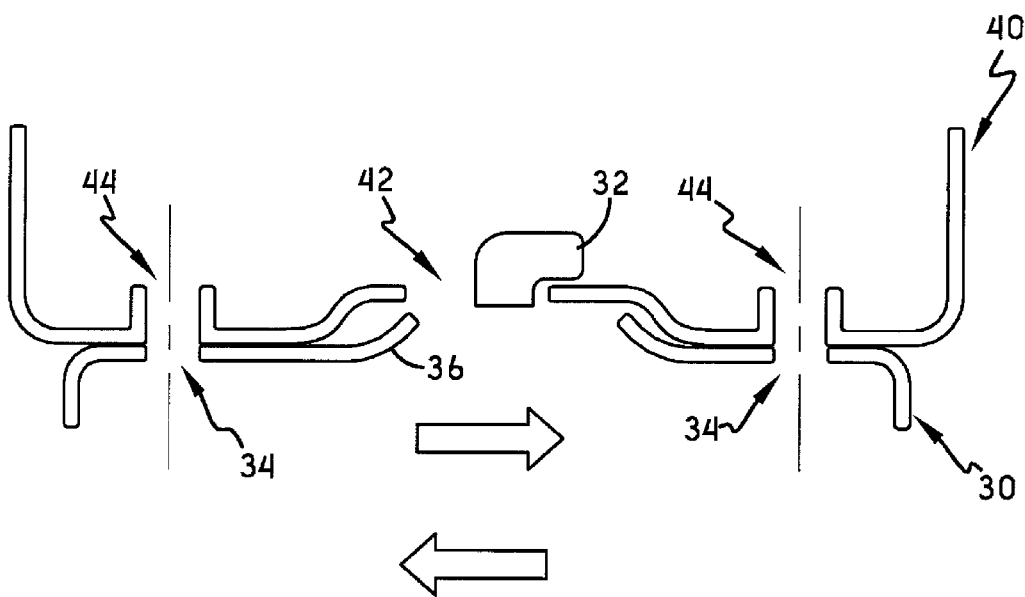

As particularly demonstrated by FIGS. 4A and 4B, the aforementioned aligning of the module assembly 12 includes transversely sliding a surface of a module assembly support bracket 30 against a mating surface of the frame portion 40 so as to bring the hook 32 into engagement with the aperture 42. The support bracket 30 includes the aforementioned module assembly holes 34 and the frame portion 40 includes the frame portion holes 44. After inserting the hook 32 in a hook insertion position, as shown in FIG. 4A, the transverse sliding action brings the respective holes 34, 44 into alignment at a hook engagement position, as shown in FIG. 4B.

Referring to FIG. 1 and as mentioned hereinabove, the assembling of the supplemental restraint system module assembly 12 to the airbag deployment chute 22 may include a sub-step of inserting a hook plate 16 mounted to the module assembly 12 into a first window 26 on the airbag deployment chute 22. Another sub-step may be performed of inserting a detachable bracket 18 into a second window 28 on the airbag deployment chute 22. An additional sub-step may be performed of securing the detachable bracket 18 to the side of the module assembly 12, so as to result in a stable mounting of the module assembly 12 and the instrument panel 20.

Figure 5A:
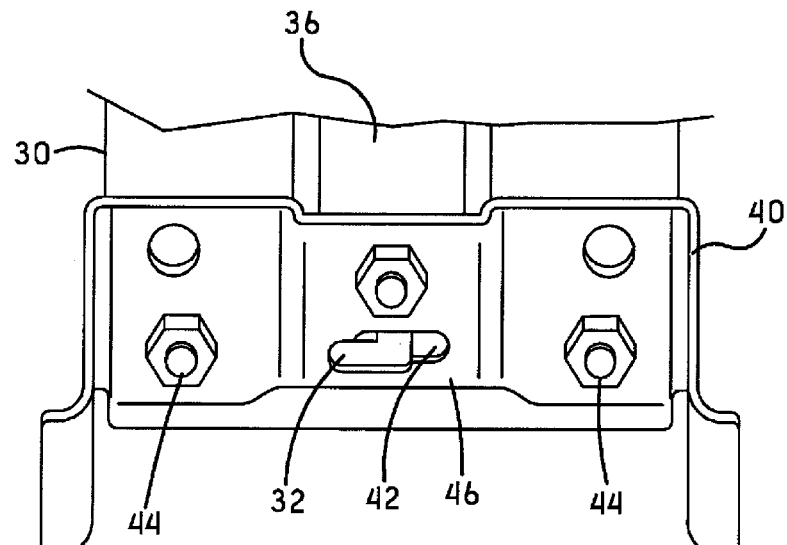
FIGS. 5A and 5B are respective front and rear views of the assembled module assembly support bracket with the frame portion in accordance with the present invention.
Figure 5B:
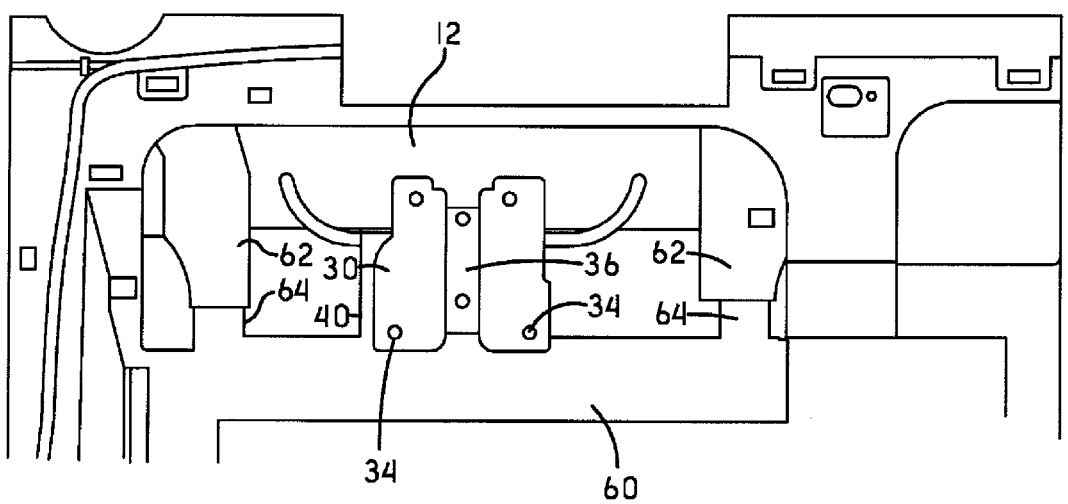

As further indicated in FIGS. 2 and 5B, the frame portion 40 may be mounted to a structural member 60 that supports the instrument panel 20 to the vehicle frame. To provide additional support thereto, a number of instrument panel supports 62 may extend downwardly from the instrument panel and engage a respective number of structural member supports 64 that extend upwardly from the structural member 60. These supports 62, 64 may be secured with a fastener such as a bolt, as should be appreciated.

As discussed hereinabove and generally shown in FIG. 1, the instrument panel 20 is affixed to the airbag deployment chute 22. These components can be joined in any suitable manner as would occur to one having skill in the art. For example, they can be joined with an adhesive or fusion bonded or joined with fasteners such as screws. In one embodiment, the instrument panel is affixed to the airbag deployment chute through a welding process, such as vibration welding, as is understood in the art.

Figure 6A:
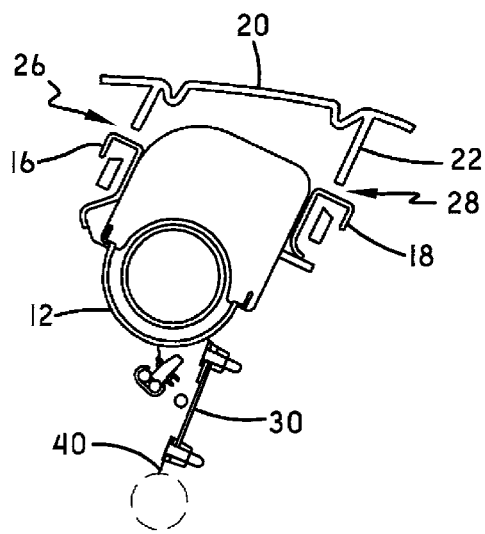
Figure 6B:
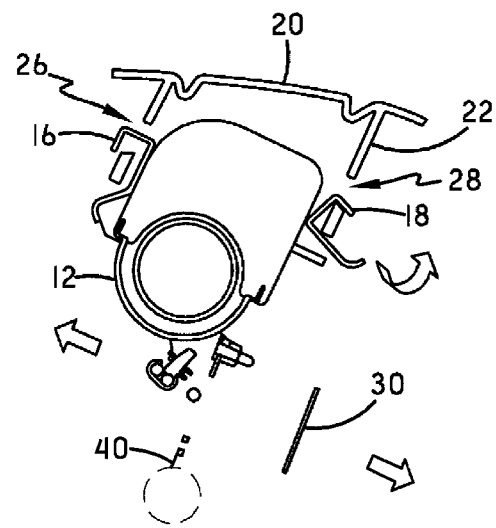

Though generally making continual reference to the FIGURES as indicated above and to the reference numerals indicated therein, specific reference is now made to FIGS. 6A, 6B, 6C, and 6D that depict a method of removing a supplementary restraint system 10 for a vehicle occupant. FIG. 6A shows the assembled system 10. As shown in FIG. 6B, a supplemental restraint system module assembly 12 is detached from a frame portion 40 mounted to a vehicle. This may be implemented by detaching the module assembly 12 from a detachable bracket 30 mounted to the frame portion

40. This may be performed by removing one or more fasteners that secure the bracket 30 to both the module assembly 12 and the frame portion 40.

As also indicated in FIG. 6B, a removable hook plate 18 is detached from the module assembly 12. This may be performed by removing a fastener that secures the hook plate 18 to the module assembly 12 and lifting the removable hook plate 18 from a second window in the airbag deployment chute 12 following the detaching of the removable hook plate 18 from the module assembly 12, and then rotating the removable hook plate 18 away from the module assembly 12.

Figure 6C:
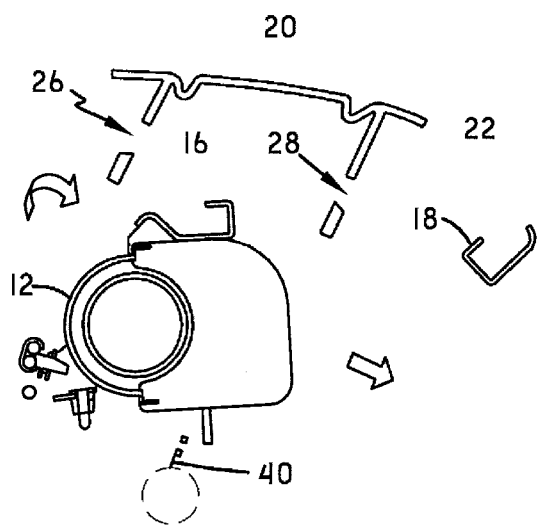
Figure 6D:
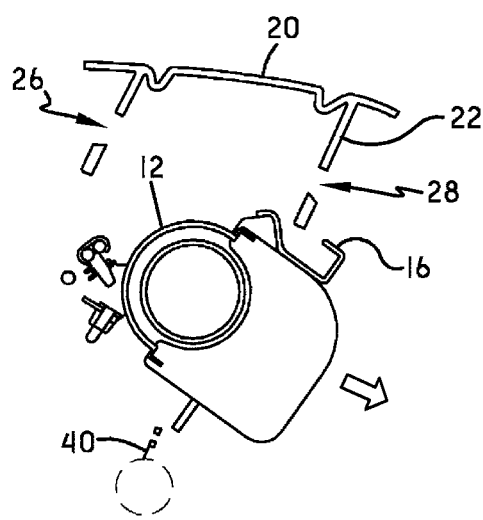

As indicated in FIG. 6C, a fixed hook plate 16 attached to the module assembly 12 is lifted from engagement with an airbag deployment chute 22. This may be performed by lifting the fixed hook plate 16 from a first window 26 in the airbag deployment chute. Subsequently, as shown in FIG. 6D, the module assembly 12 is removed from underneath a vehicle instrument panel. In order to install a new SRS module assembly 12 after deployment, the aforementioned steps may be performed in the reverse order, so as to refit a new module assembly 12 underneath an instrument panel 20 of an operating vehicle.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A method of installing a supplementary restraint system for a vehicle occupant comprising the steps of:
   (a) providing an instrument panel for a vehicle having an airbag deployment chute affixed to the instrument panel;
   (b) assembling a supplemental restraint system module assembly to the airbag deployment chute;
   (c) attaching the instrument panel with the module assembly onto a frame portion on the vehicle, wherein step (c) comprises the steps of:
      (c1) inserting a hook attached to the module assembly into an aperture on the frame portion;
      (c2) aligning the module assembly so that the hook engages an edge of the aperture and at least one module assembly hole lines up with at least one frame portion hole; and
      (c3) affixing at least one fastener into the holes so as to secure the module assembly and instrument panel to the frame portion.

2. The method of claim 1, wherein step (b) comprises the steps of:
   inserting a hook plate mounted to the module assembly into a first window on the airbag deployment chute;
   inserting a detachable bracket into a second window on the airbag deployment chute; and
   securing the detachable bracket to the side of the module assembly.

3. The method of claim 1, wherein step (c2) comprises the steps of:
   transversely sliding a surface of a module assembly support bracket including the at least one module assembly hole against a mating surface of the frame portion including the at least one frame portion hole so as to bring the hook into engagement and the respective holes into alignment.

4. The method of claim 1, wherein step (a) comprises the step of:
affixing the airbag deployment chute to the instrument panel through a welding process.

5. A supplementary restraint system for a vehicle occupant comprising:
   a supplemental restraint system module assembly connected to an airbag deployment chute incorporated into a vehicle instrument panel;
   a module assembly support bracket that attaches the module assembly onto a frame portion on the vehicle, wherein the support bracket comprises:
      a hook for insertion into an aperture on the frame portion; and
      at least one bracket hole for alignment with at least one frame portion hole upon proper positioning of the hook.

6. The supplementary restraint system of claim 5, wherein the support bracket extends away from the module assembly in a direction opposite the instrument panel and generally parallel to an axis of the airbag deployment chute.

7. The supplementary restraint system of claim 5, wherein the support bracket comprises a contact surface for engaging a mating surface on the frame portion.

8. The supplementary restraint system of claim 7, wherein the aperture is formed onto the mating surface of the frame portion and wherein the hook extends perpendicularly from a bottom edge of the support bracket so as to be received within the aperture when the contact surface engages the mating surface.

9. The supplementary restraint system of claim 8, wherein the contact surface comprises a protruding portion and the mating surface comprises a channel portion for slidably receiving the protruding portion, wherein the hook extends perpendicularly from the protruding portion and wherein the aperture is formed in the channel portion to engage the hook, wherein the protruding portion slides in the channel portion between a hook insertion position and a hook engagement position in which the holes are aligned.

10. The supplementary restraint system of claim 9, wherein the at least one bracket hole comprises first and second bracket holes respectively disposed on opposite sides of the protruding portion, so as to align with respective first and second frame portion holes respectively disposed on opposite sides of the channel portion.

11. The supplementary restraint system of claim 5, wherein the supplemental restraint system module assembly comprises a hook assembly for removably connecting to the airbag deployment chute.

12. The supplementary restraint system of claim 11, wherein the hook assembly comprises:
   a hook plate mounted to the module assembly for insertion into a first window on the airbag deployment chute; and
   a detachable bracket for insertion into a second window on the airbag deployment chute and detachably secured to the side of the module assembly.

13. The supplementary restraint system of claim 5, wherein the airbag deployment chute is affixed to an interior surface of the instrument panel.

14. The supplementary restraint system of claim 5, wherein the instrument panel comprises a frangible portion, proximate to the airbag deployment chute, that breaks away to allow airbag deployment.

15. The supplementary restraint system of claim 14, wherein the instrument panel further comprises a plurality of tear seams along which the frangible portion breaks away during airbag deployment.

16. The supplementary restraint system of claim 15, wherein the tear seams are located proximate to a periphery of the airbag deployment chute and along a central portion thereof.

17. A method of removing a supplementary restraint system for a vehicle occupant comprising the steps of:
(a) detaching a supplemental restraint system module assembly from a frame portion mounted to a vehicle;
(b) detaching a removable hook plate from the module assembly;
(c) lifting a fixed hook plate attached to the module assembly from engagement with an airbag deployment chute; and
(d) removing the module assembly from underneath a vehicle instrument panel.

18. The method of claim 17, wherein step (a) comprises the steps of:
detaching the module assembly from a detachable bracket mounted to the frame portion.

19. The method of claim 17, wherein step (c) comprises the step of:
lifting the fixed hook plate from a window in the airbag deployment chute.

20. The method of claim 19, wherein the window in the airbag deployment chute is a first window, and further comprising the step of:
lifting the removable hook plate from a second window in the airbag deployment chute following the detaching of the removable hook plate from the module assembly.

* * * * *